United States Patent [19]

Nevin

[11] Patent Number: 5,627,458
[45] Date of Patent: May 6, 1997

[54] INTEGRATED NEGATIVE D-C BIAS CIRCUIT

[76] Inventor: Larry J. Nevin, 1551 La Granada Dr., Thousand Oaks, Calif. 91362

[21] Appl. No.: 502,073

[22] Filed: Jul. 14, 1995

[51] Int. Cl.$^6$ .................................. H02M 3/18
[52] U.S. Cl. ........................... 323/267; 363/61
[58] Field of Search ..................... 363/59–61, 63; 323/267; 307/109, 110, 284; 320/1

[56] References Cited

U.S. PATENT DOCUMENTS

| | | | |
|---|---|---|---|
| 4,636,930 | 1/1987 | Bingham et al. | 363/60 |
| 4,679,134 | 7/1987 | Bingham et al. | 363/61 |
| 4,777,577 | 10/1988 | Bingham et al. | 363/60 |
| 4,797,899 | 1/1989 | Fuller et al. | 375/7 |
| 4,809,152 | 2/1989 | Bingham et al. | 363/61 |
| 4,897,774 | 1/1990 | Bingham et al. | 363/61 |
| 4,999,761 | 3/1991 | Bingham et al. | 363/60 |

OTHER PUBLICATIONS

Apr. 1994 Harris Semiconductor ICL7660 CMOS Voltage Converter (pp. 7–109, 7–110, 7–113).
(Date Uncertain) Maxim, Inc.—three sheets of product descriptions & advertising literature on a "GaAs FET" power supplies.
(Date Uncertain) Mitsubishi—nine sheets of product literature and preliminary specification of a Mitsubishi integrated bias circuit.

*Primary Examiner*—Aditya Krishnan
*Attorney, Agent, or Firm*—Gene W. Arant

[57] ABSTRACT

A low power amplifier system contains a number of amplifier stages, each having a control terminal, and a bias circuit parameter that can be measured as a voltage. A monolithic integrated circuit includes a plurality of bias control amplifiers, one for each of the amplifier stages. A positive supply voltage is fed into the integrated circuit, and in response thereto a negative supply voltage is generated, both voltages being then applied to each of the bias control amplifiers. A voltage feedback signal indicative of the bias current in each one of the respective external amplifier circuits is supplied to the corresponding one of the bias control amplifiers. Each bias control amplifier is then operable to compare the received voltage feedback signal with a reference voltage derived from the positive supply voltage and/or the negative supply voltage, for producing an error signal indicative of an error in the bias current in the respective external amplifier stage, and also for amplifying that error signal. The amplified error signal is then supplied to the control terminal of the associated amplifier stage to control the bias current.

15 Claims, 7 Drawing Sheets

INTEGRATED NEGATIVE D-C BIAS CIRCUIT

FIELD OF THE INVENTION

The present invention relates to a monolithic integrated circuit for controlling the D-C bias currents of a plurality of external devices, such as amplifier stages.

BACKGROUND OF THE INVENTION

For television and other communication signals which are broadcast from satellite or land-based transmitters, a high quality low-noise receiver is required to detect the received low-level signals and preserve signal quality for faithful reproduction of signal content. Such receivers very typically involve several stages of signal amplification, performed by amplifiers designed using Gallium Arsenide (GaAs)-based transistors and integrated circuits. For each amplifier stage, it is required to provide an appropriate D-C bias to the operating transistors, in the form of prescribed voltages and currents applied to the device terminals. Since the biasing needs of the various stages will, in general, be somewhat different, it has therefore been the usual practice to provide a separate biasing circuit as an integral part of each associated amplifier stage. Thus biasing circuits may represent a significant portion of the electronic content of the receiver.

In today's world-wide environment of proliferating wireless communications, particularly for television which normally is broadcast at high frequencies and at low signal level, these low-noise receivers are manufactured in large quantities, in a very competitive economy which drives continuing reductions in cost and price. In that process, the costs of the amplifier stages themselves are reduced through innovations which reduce piece parts prices as well as the number of parts used, resulting in both material and assembly cost reductions. Increasingly, these ends are accomplished through application of integrated circuit technology for the amplifier components.

In conjunction with the amplifier stage cost improvements, it is highly desirable to provide ways of further reducing the product manufacturing cost for the associated bias circuitry, while maintaining a high level of performance, using the same techniques: parts price reduction, parts count reduction, and monolithic integration of the associated bias circuitry. Since low-noise receivers are by definition operated at very low signal strength, the technical prospect of minimizing the manufacturing costs for correspondingly low power bias circuits is excellent.

There are a number of elements of contribution to be considered in the development of an appropriate bias circuit for these applications. It is significant to note that the key to controlling bias voltages and currents in GaAs devices is that the controlling element of the device is gate terminal voltage, operated at a negative potential with respect to the device source terminal, which is normally at ground potential. Further, low-noise devices offer optimal performance at prescribed drain bias currents, which ideally should be held constant over variations in associated circuit component values and variations in temperature. In terms of manufacture, the bias current should be established automatically, avoiding any need for either labor- or machine-based setting or adjustment in the high-volume, low cost business environment. Further, the biasing system should involve very few parts in order to reduce parts counts and piece-part costs, and also to minimize circuit space which reduces attendant costs of the printed circuit boards, of the metal housings, and of packaging and shipping. The present invention achieves all of these goals.

SUMMARY OF PRIOR ART

FIG. 1 shows a known type of self-bias circuit that has been extensively employed in GaAs Field Effect Transistor (GaAs FET) amplifier design. FIG. 2 shows a known type of improved bias circuit in which a bias control amplifier measures an actual bias point, compares it to a reference voltage, and actively controls the bias point to the desired value by applying a correction voltage to the control gate of the GaAs FET device such that measurement and reference are equal.

The self-bias system 1 shown schematically in FIG. 1 consists of a Gallium Arsenide Field Effect Transistor ("GaAs FET") *2, a gate inductor *3, a drain inductor *4, a source resistor *5 and a source bypass capacitor *6. In this design, the drain current passing through the source resistor *5 creates a positive source voltage, while the gate is D-C grounded. This bias condition is operable through the fact that the gate inductor *3 conducts D-C current to ground while isolating signal currents from ground, and the source bypass capacitor *6 blocks D-C current, forcing it to flow through the source resistor *5, while conducting signal currents to ground. In this design, the transistor characteristics and resistor value establish a unique equilibrium operating condition which can be determined graphically from the transistor characteristics to meet a specified bias current level. Although this design is simple and has a relatively low cost, it suffers from lack of precise control of bias current, since bias current varies with features of the characteristics which cannot be correlated with bias requirements.

An improved prior art system for D-C current bias is the transistor active bias system *14 as shown in FIG. 2, which employs a bias control transistor *7 which senses, on its emitter terminal, the drain voltage of the GaAs FET *13. This voltage is compared to a fixed voltage applied to the base terminal of the bias control transistor *7, created through the resistor voltage divider *8 which divides the voltage between the supply voltage and ground. The sensed voltage at the emitter of the bias control transistor *7 determines the value of GaAs FET drain current, which flows through the GaAs FET drain resistor *9 of known value and subscribes to the relationship:

$$Vsensed = Vdd - Idrain * Rd,$$

using the fact that, by design, very little current flows into the emitter of the bias control transistor. (Note that signal isolation inductances and bypass capacitors are omitted from this schematic, for simplicity.)

A compensation capacitor *10 is connected between the base and collector terminals of the bias control transistor *7 for the purpose of providing close-loop stability of the amplifier system which consists of both the GaAs FET *13 and the bias control transistor *7. A negative voltage generator *11 is connected to one end of the current sink resistor *12 and generates a current flow in the direction toward the negative voltage generator *11, thereby enabling the collector of the bias control transistor *7 to be pulled negative, as collector current, which flows out of the collector terminal, is reduced. Such negative excursions are required to supply negative voltage to the control gate of the GaAs FET, enabling its adjustment to control the proper level of bias current as measured by the sensed voltage described above.

In the low-noise receiver industry, the negative voltage generator *11 of FIG. 2 is commonly developed with a standard integrated circuit, the 555 timer oscillator, with the addition of diode rectification and capacitive filters. In designing a pulse train or clock signal generator, such as those designed with the 555 timer, external timing components are typically used. The components comprise either a timing capacitance or timing resistor or both.

SUMMARY OF THE INVENTION

According to the invention a monolithic integrated circuit is provided for controlling the operation of a number of external circuits which may, for example, be amplifier stages.

In the invention, a fully monolithic integrated D-C bias circuit is realized, which includes the circuits for the generation of required negative voltages from the positive voltage input, as well as the active bias control circuits capable of controlling D-C bias for a plurality of external amplifier or other stages, and the means for activating and deactivating sets of the external stages as instructed by an external control line.

Further, each function in the design is realized as a minimum cost element, to achieve a minimum cost for the integrated D-C bias circuit, through minimization of circuit complexity and size in designs which are by themselves also a significant part of the invention.

According to the presently preferred form of the invention each of the external amplifier stages has a control terminal, and a bias circuit parameter that can be measured as a voltage. The monolithic integrated circuit includes a plurality of bias control amplifiers, one for each of the external amplifier stages. A positive supply voltage is fed from an external source into the integrated circuit, and in response thereto a negative supply voltage is generated, both voltages being then applied to each of the bias control amplifiers. A voltage feedback signal indicative of a measurement of the bias current in each one of the respective external amplifier circuits is supplied to the corresponding one of the bias control amplifiers. Each bias control amplifier is then operable to compare the received voltage feedback signal and a reference voltage which is derived from the positive supply voltage and/or the negative supply voltage, for producing an error signal indicative of an error in the bias current in the respective external amplifier stage, and also for amplifying that error signal. The amplified error signal is then supplied to the control terminal of the associated amplifier stage, and operates as negative feedback to control the bias current to its desired value.

A means is established whereby complementary sets of amplifiers may be biased into active, or inactive states, in response to an external signal input, thereby enabling control of the receiver signal path.

Thus the object of the present invention is to provide biasing or other control circuitry for low-noise, low-signal-strength circuitry, such as amplifiers, which will have a reduced cost of manufacture compared to the prior art, without sacrifice of performance or quality.

LIST OF REFERENCE NUMBERS AND PART NAMES

Figure 1:
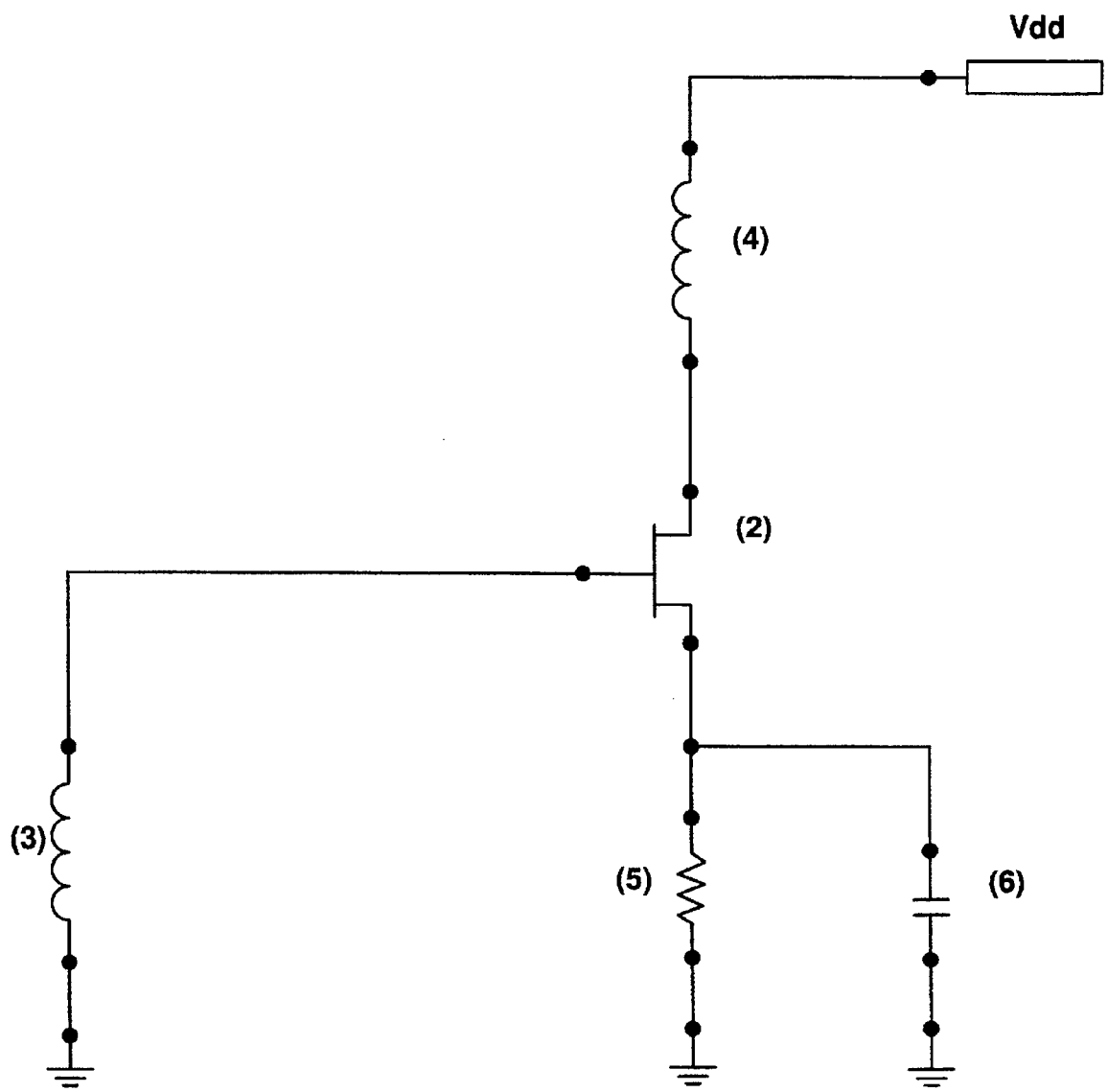
FIG. 1 is a schematic diagram of a self-bias system of the prior art.

1 Self-bias system
2 GaAs FET (self-bias scheme)
3 GaAs FET gate inductor
4 GaAs FET drain inductor
5 GaAs FET source resistor
6 GaAs FET source bypass capacitor
7 Bias control transistor
8 Resistor voltage divider
9 GaAs FET drain resistor
10 Compensation capacitor
11 Negative voltage generator
12 Current sink resistor
13 GaAs FET (bipolar bias scheme)
14 Transistor active bias system
15 Monolithic integrated bias circuit
16 GaAs FET
17 GaAs FET control gate
18 Bias control amplifier
19 Positive voltage supply
20 Bias error reference voltage
22 Circuit ground
24 Voltage inverter
28 Bias feedback terminal
30 Bias output terminal
31 Internal bias network
32 On/Off comparator
33 Comparator inverter
34 Astable multivibrator
35 GaAs FET drain resistor
36 Differential amplifier
38 Common source transistor amplifier
39 Output limiter
40 Output sink current source
42 Feedback compensation capacitor
44 Grounding switch
46 Output series switch
48 Charging inverter
50 Charge pump capacitor
52 Storage capacitor
54 Grounding switch driver
56 Output series switch driver
58 Gate drive inverter
60 Gate drive pulldown
62 Gate drive isolation switch
64 Blocking capacitor
66 Clamping transistor
68 Charge source
70 Positive current source
72 Negative current source
74 Regenerative inverter (first of two)
75 Regenerative inverter (second of two)
76 Buffer inverter
78 Series isolation switch
80 Timing capacitor
82 On/Off control signal
84 On/Off internal reference voltage
85 On/Off switch

DESCRIPTION OF THE PREFERRED EMBODIMENT (FIGS. 3–7)

Integrated Circuit

In order to achieve a low cost negative D-C bias circuit, a high level of integration of the discrete components must be attained. In addition, the size of the integrated circuit, and the pin count of the package which contains it, must also be minimized as factors contributing to cost.

Figure 3:
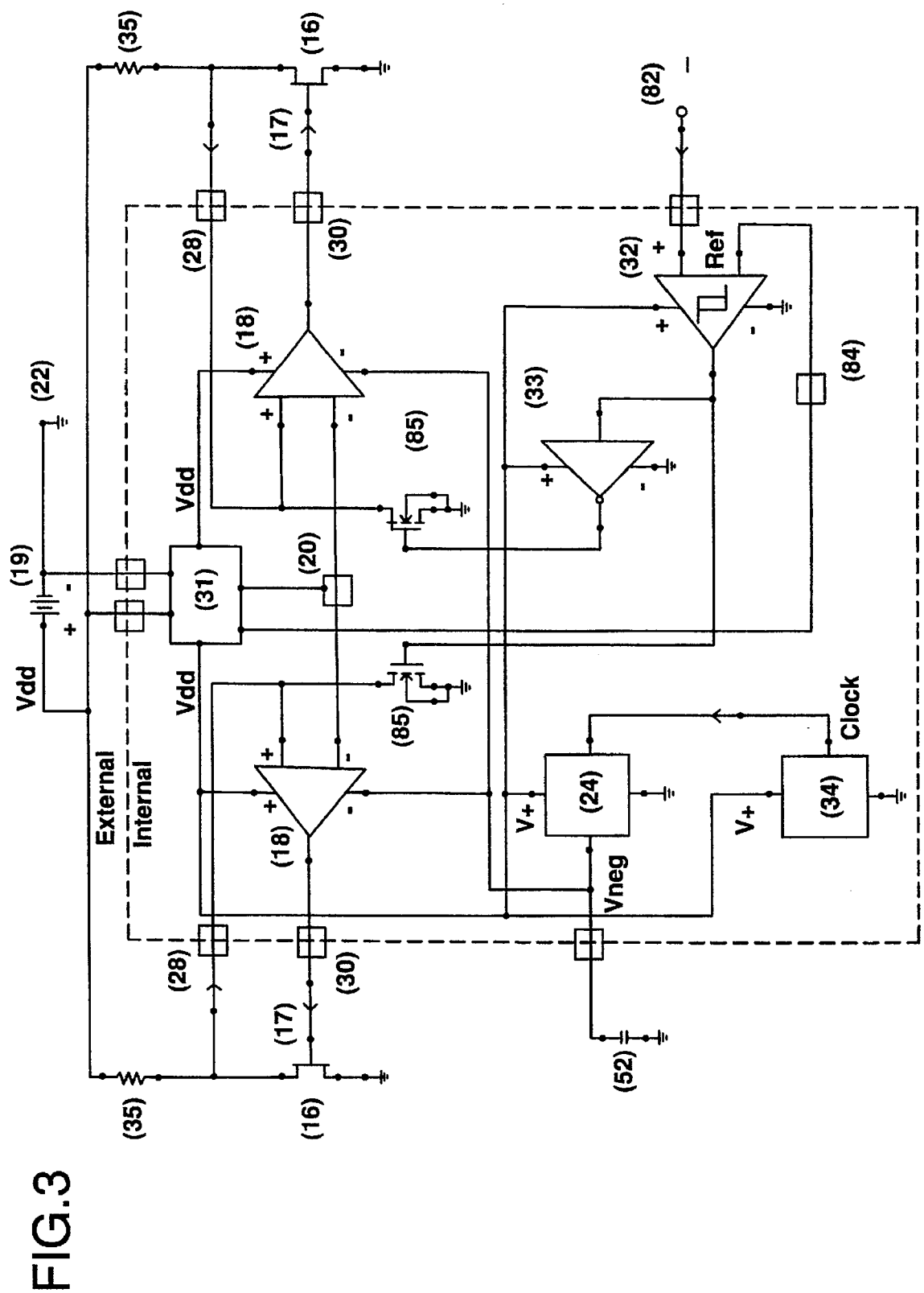
FIG. 3 is a schematic block diagram of the presently preferred form of the novel integrated negative D-C bias circuit.
Figure 4:
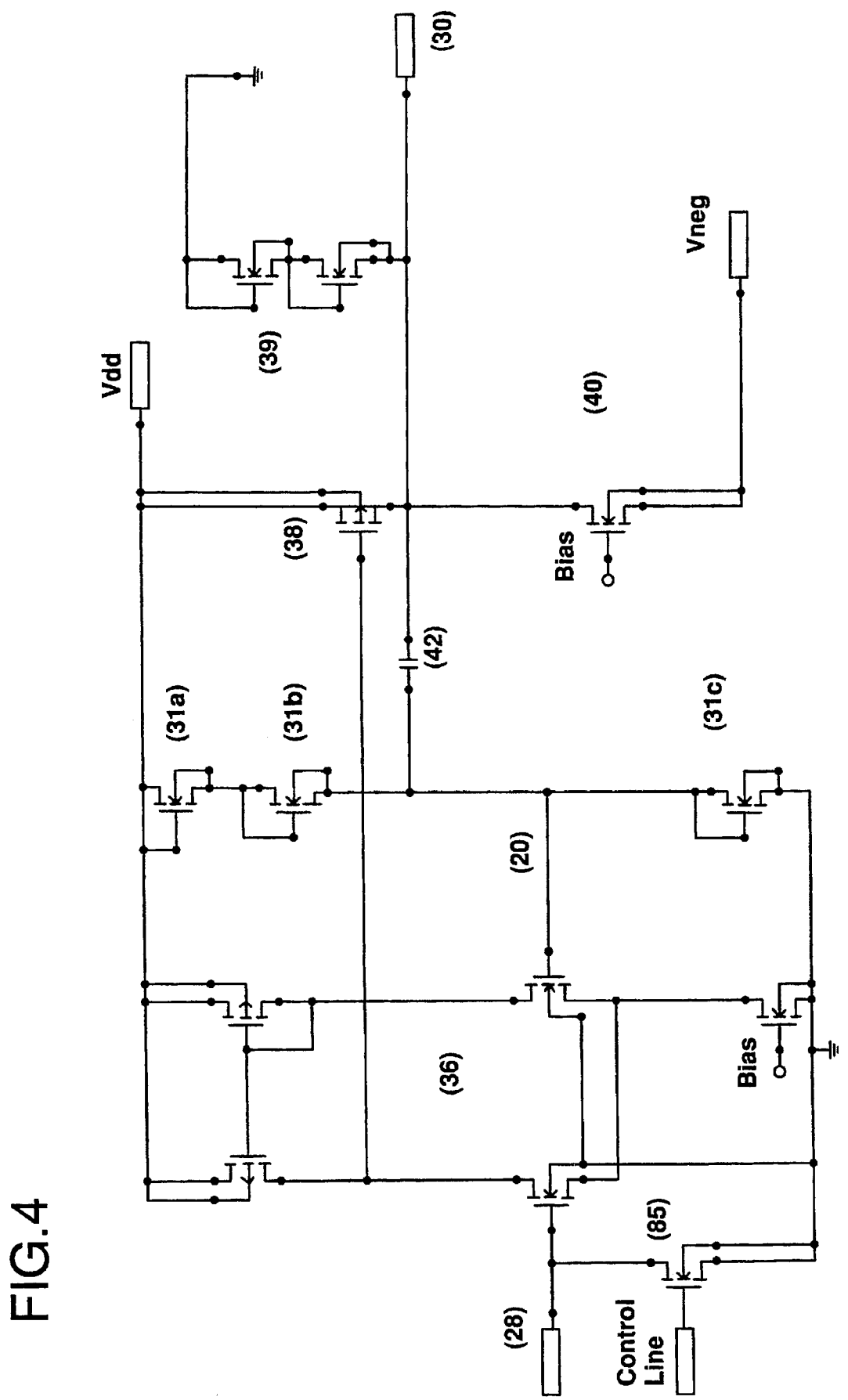
FIG. 4 is a schematic diagram of one of the bias control amplifier circuits of FIG. 3.
Figure 5:
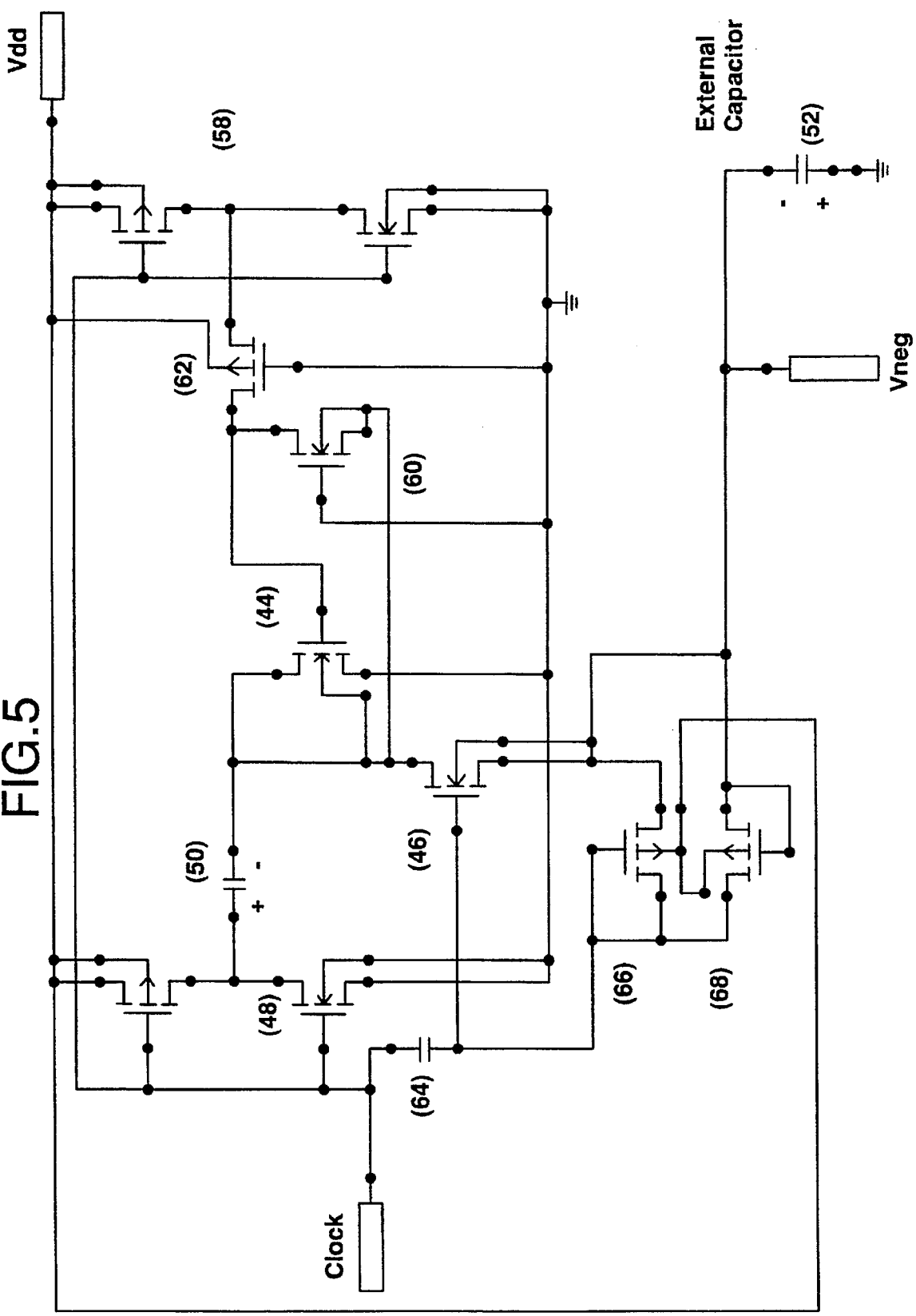
FIG. 5 is a schematic diagram of the voltage inverter circuit of FIG. 3.
Figure 6:
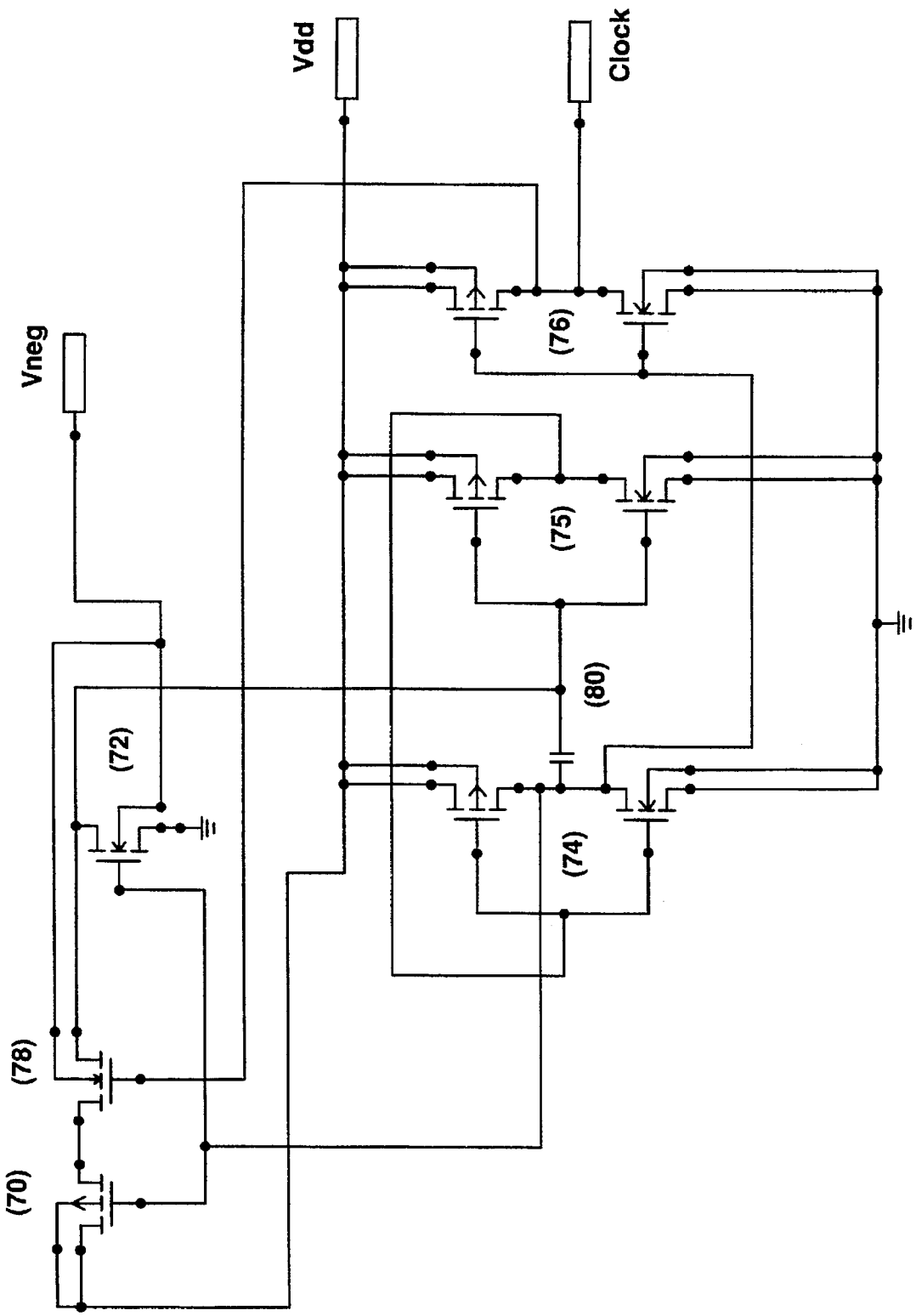
FIG. 6 is a schematic diagram of the astable multivibrator of FIG. 3.
Figure 7:
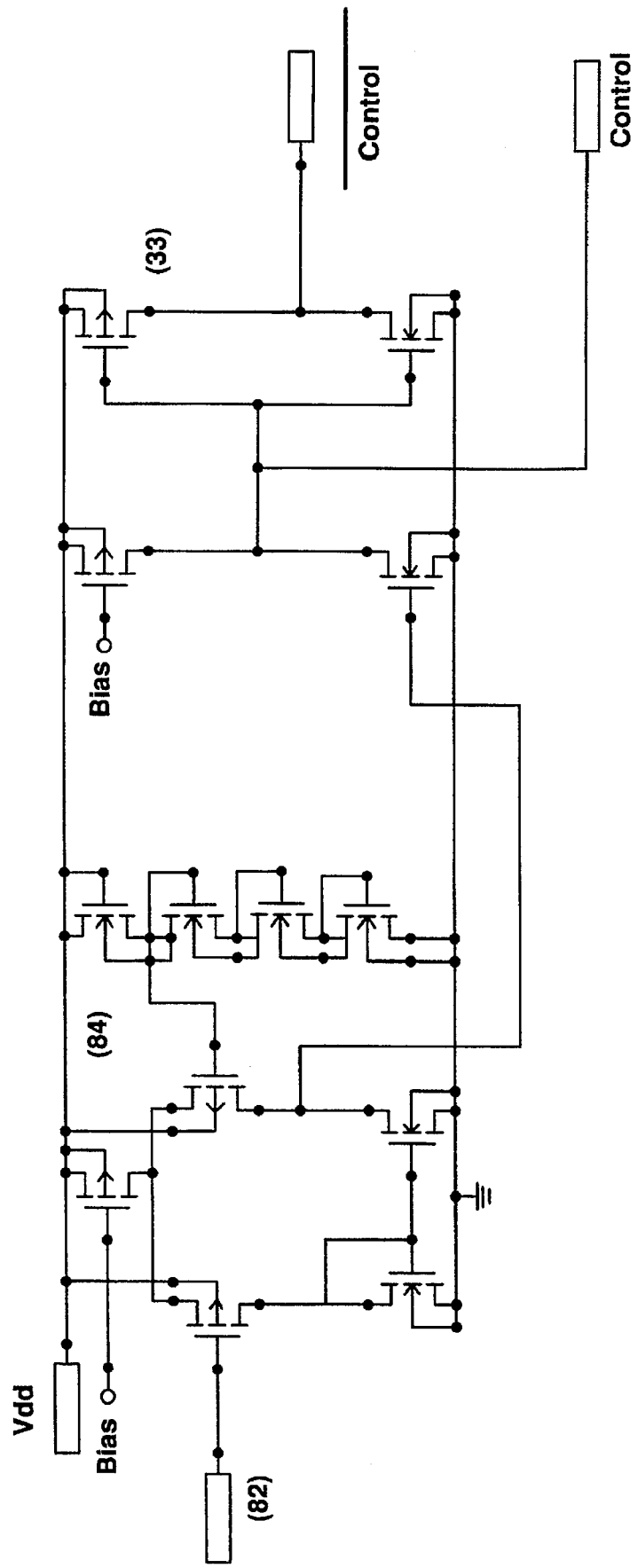
FIG. 7 is a schematic diagram of the comparator circuit of FIG. 3.

Thus as shown in FIG. 3 a monolithic integrated circuit *15 is adapted for generating the negative control voltages for a plurality of external active amplifier stages, only two of which are shown. Each external stage includes a Gallium Arsenide Field Effect Transistor ("GaAs FET") *16 having a control terminal *17 for independently controlling the bias current for each respective one of the GaAs FETs *16.

There is a plurality of bias control amplifiers *18, one for each of the external amplifier stages. Means is provided for feeding a positive supply voltage from the positive voltage supply *19 into the monolithic integrated circuit and applying it to each of the bias control amplifiers *18, as well as to other components.

A voltage inverter *24 within the monolithic integrated circuit, responsive to the positive supply voltage, generates a negative supply voltage that is approximately equal in magnitude to the positive bias voltage, and applies the negative supply voltage to each of said bias control amplifiers. Said voltages are referenced to the circuit ground *22. The circuit of FIG. 3 shows, by way of example, only two external amplifier stages.

From each of the external amplifier stages a voltage feedback signal indicative of a measurement of the bias current in the respective amplifier stage is provided to a corresponding one of the bias control amplifiers *18 through a bias feedback terminal *28.

Each of the bias control amplifiers *18 is then operable to compare the received voltage feedback signal and an internal bias error reference voltage *20 derived from the positive supply voltage and/or negative supply voltage, using an internal bias network *31, for producing an error signal indicative of an error in the bias current in the respective amplifier stage, and also for amplifying that error signal. (It should be noted that in the present embodiment the internal bias error reference voltage *20 is the same for all amplifier stages). Each amplified error signal is then applied through a bias output terminal *30 to the control terminal *17 of the associated GaAs FET *16, providing the negative feedback to control the respective bias current to its desired level.

Means is provided to control the state of each bias control amplifier *18, so that it may bias its associated GaAs FET *16 into an active, or an inactive state. Said control is effected by On/Off switches *85 actuated from the output of an On/Off comparator *32 (or from the complement of this output as obtained through the comparator inverter *33) which responds to an external On/Off control signal *82.

The monolithic integrated circuit *15 comprises therefore a set of bias control amplifiers *18 with an internal bias reference voltage *20, a voltage inverter *24, an astable multivibrator *34, and an On/Off comparator *32 with comparator inverter *33.

In the preferred embodiment, a fully integrated bias circuit is realized in C-MOS (Complementary Metal Oxide Semiconductor, in Silicon) technology, capitalizing on properties of this technology to achieve certain benefits of the invention. This embodiment is preferred, compared to hybrid combinations of components which separately realize similar functions, for its parts cost-effectiveness, parts count and assembly cost reduction, and its small size. It is preferred compared to alternative integration in the GaAs technology of the external amplifiers, which is not capable of achieving the integration cost benefit because GaAs wafer costs are considerably higher than Silicon C-MOS. And it is preferred compared to alternative integration in low-cost Silicon bipolar technology which leads to circuit solutions which are not as efficient in performance of the voltage inverter, and in addition requires additional external components for proper operation in the applications.

As shown in FIG. 3 the integrated circuit has eight pins, two of which are for positive and ground supply voltages, two pairs of which are used for corresponding external amplifiers, one of which is for the on-off control, and one of which is for an external storage capacitor *52. If bias control for a larger number of external amplifiers is required, a larger number of pins will be needed.

Bias Control Amplifier

The bias control amplifier *18 amplifies the difference between the external feedback signals available at the bias feedback terminal *28 and the bias error reference voltage *20. It is comprised of a conventional differential amplifier *36 utilizing five C-MOS devices in a well known manner as the first stage, a common source transistor amplifier *38 as the second stage, an output sink current source *40, an output limiter *39, and a feedback compensation capacitor *42 for preventing oscillations and thus stabilizing the circuit.

The bias error reference voltage *20 is established by voltage division using the positive supply voltage and/or negative supply voltage. The differential amplifier *36 amplifies the difference between the signal at the bias feedback terminal *28 and the bias error reference voltage *20, and applies the amplified difference as an error signal to the common source transistor amplifier *38 for further amplification and level shifting before it reaches the bias output terminal *30.

The output sink current source *40 is connected to the output of the common source transistor amplifier *38, and provides sufficient current to sink the current from the external load, from which the current flows positively into the amplifier output. This current sink allows the output voltage to reach a negative value, as required by properties of the GaAs FET control terminal *17.

In order to protect the GaAs FET control terminal *17 from any overload conditions that may arise from circuit turn-on transients or improper external connections at the circuit input, an output limiter *39 is incorporated into the amplifier circuit. The output limiter *39 comprises two n-channel MOS transistors connected in series such that they begin conduction at a voltage greater than two times the threshold voltage for each device, and after this point constrain further negative voltage increases by supplying all the current demanded by the fixed current of the output sink current source *40. Voltage in the positive direction is limited by the connection of the device body diodes from output to ground.

The bias control amplifier *18 forms a closed loop system with its external biased GaAs FET *16 device. Under normal operation, the loop gain is negative, which means the closed loop system is in a quiescent state. However, at frequencies for which the amplifier combination may exceed 180 degrees phase shift while having closed loop gain greater than unity, oscillation can occur. To prevent oscillation, an internal feedback compensation capacitor *42 is connected from the amplifier output to an internal node of inverse gain. At low frequencies, the internal feedback compensation capacitor *42 effectuates an amplifier with unity gain and with minimal phase shift. This combination thus allows a simple external circuit to control the gain roll-off at intermediate frequencies before the more complex internal amplifier behavior is introduced at higher frequencies, and thus to prevent conditions for oscillation.

The preferred C-MOS embodiment of the bias control amplifier *18 provides naturally the high input impedances that are needed to isolate receiver signals from the external amplifier stages, at the bias connection points, obviating the need for external components to provide such isolation. This embodiment also facilitates feedback stabilization using a small capacitance, which then may be integrated on-chip to save extra components as well as package pins, again because of the high impedance levels. A bias control amplifier could be integrated in other technologies, such as the GaAs of the external amplifiers, or in Silicon bipolar technology. Neither alternative offers the combination of low cost, the technical features stated, or the compatibility with the preferred technology for the voltage inverter which is discussed below.

Voltage Inverter

The voltage inverter *24 is driven by the clock pulse wavetrain of an astable multivibrator *34. It inverts the positive supply voltage to create the negative supply voltage as needed to provide external control, at negative voltage, through the bias control amplifier *18. It uses a grounding switch *44 to clamp the input clock pulse negatively to ground, and an output series switch *46 to transfer this negative voltage to a storage capacitor *52. The voltage inverter *24 comprises a charging inverter *48, a charge pump capacitor *50, a storage capacitor *52, a grounding switch *44, an output series switch *46, a gate drive inverter *58, a gate drive pulldown *60, a gate drive isolation switch *62, a blocking capacitor *64, a clamping transistor *66 and a charge source *68.

The charging inverter *48 is driven from the output of the astable multivibrator *34 and provides a sharp square wave voltage drive to charge and discharge the charge pump capacitor *50.

During the charge cycle, the pump capacitor *50 is charged with voltage polarity shown by conduction through grounding switch *44. The grounding switch *44 then remains off during the discharge cycle.

During the discharge cycle, the output series switch *46 provides a conduction path from the charging inverter *48, through the charge pump capacitor *50, and to the storage capacitor *52. This connection transfers charge from the charge pump capacitor *50 to the storage capacitor *52, with a polarity which establishes the negative voltage polarity shown, said polarity arising from the manner in which the charge pump capacitor *50 and storage capacitor *52 are connected in the discharge cycle. The output series switch *46 then remains off during the charge cycle.

Two important properties of a voltage supply must be considered here: output current capacity, and voltage ripple. The former depends upon the rate of charge transfer to the output, while the latter is a function of the ratio of charge transferred per cycle, to charge stored.

The amount of output charge transferred increases with the value of charge pump capacitance, and the allowed output current is the amount of charge transferred per cycle, multiplied by the switching cycle rate of the circuit. Since the integrated circuit is designed to minimize area and this in turn imposes a limitation on the size of the charge pump capacitor *50, the switching rate was increased by a factor of 1000, from 1 KHz to 1 MHz, in order to sustain higher output currents while reducing the size of the charge pump capacitor *50. In the preferred embodiment described this value is 50 pF, which is realized as a small area on the integrated circuit chip.

At a given output current, a fixed charge per cycle is placed on the storage capacitor *52, to replace charge consumed by output current. This charge results in a voltage increment which is in direct proportion to the charge, and inversely proportional to the storage capacitance. This voltage increment, which is equivalent to voltage ripple, is therefore proportional to the charge pump capacitance, and thus to the ratio of charge pump capacitance to output storage capacitance. The small charge pump capacitor *50 therefore allows a small voltage ripple, characterized by a preferred capacitance ratio of less than 1:1000, with use of a modest sized external storage capacitor *52.

The gate voltage of the grounding switch *44 is driven positive, to the positive supply voltage, during the charge cycle, and negative, to the negative supply voltage, during the discharge cycle. The positive gate drive is provided by the gate drive inverter *58, in series with the gate drive isolation switch *62, and is in phase with the charging inverter *48. The negative gate drive is provided by the gate drive pulldown *60, which is itself driven from the charge pump capacitor *50, the negative voltage side of which reaches approximately the negative equivalent of the positive supply voltage in the discharge cycle. The negative gate drive is necessary to prevent reverse conduction of the grounding switch *44 during the discharge cycle, an event which would divert charge from the charge pump capacitor *50 which is intended to be deposited upon the storage capacitor *52. As the grounding switch *44 gate drive is pulled negative, conduction from the gate drive inverter must be prevented (which would limit said negative excursion as well as again divert charge from the charge pump capacitor *50) and this prevention is the purpose of the gate drive isolation switch *62, which cannot conduct when both its gate and its source are at the same voltage, which is the case when the gate drive inverter is in its low output state.

The gate terminal of the output series switch *46 is cycled on and off in phase complement to the gate terminal of the grounding switch *44 during the charge and discharge cycles. The output series switch *46 is driven directly from the clock output of the astable multivibrator *34, coupled through a blocking capacitor *64. A diode-connected clamping transistor *66 clamps the gate drive voltage to the negative D-C voltage, establishing the proper switching levels for the output series switch *46 such that it is biased heavily on during the discharge cycle, readily conducting the negative output charge, and is cut off, with its gate voltage nearly equal to its source voltage, in the charge cycle. A charge source *68 provides for a negative current to charge the coupling capacitor *64 negatively and permits the clamping action.

The preferred C-MOS embodiment of the voltage inverter *24 offers significant advantages over other technologies. In C-MOS integrated circuits, the switching functions of the grounding switch *44 and the output series switch *46 are ideal inasmuch as low series loss switching is available which requires very low input charge to accomplish the switching action, an important facet of the present invention since the low series loss directly minimizes voltage loss in the voltage inversion, and the minimal input charge is necessary to the use of the small internal charge pump capacitance *50 from which said charges must be diverted. These features are enhanced in specific details of the invention, in which all drive currents that must, because of voltage level, be derived from negative voltage, are designed to consume minimum current beyond that small amount required to drive the respective switch gate voltages. The common-gate connected gate drive pulldown *60, working in combination with the gate drive isolation switch *62, is a primary element of this feature. By contrast, for example, bipolar integrated circuit technology, which could also be the basis for an inverter design, demands significant base current for switching operation and would therefore not offer this advantage. Further, the complex inverting voltage relationships typical of voltage inverter design are difficult to accommodate with bipolar technology, which do not afford the bilateral operation characteristic of C-MOS. A GaAs FET integrated circuit version would offer lower series loss switching, but due to the lack of cost-effective integrated circuits offering complementary devices, circuit designs would be more complex and not as cost effective, due in part to the greater cost of the material.

Astable Multivibrator

The astable multivibrator *34 produces a periodic wave train as the input stimulus for the voltage inverter *24. It is based on a standard C-MOS design utilizing inverters as the regeneration loop. However, the standard timing resistor is replaced with a positive transistor current source *70 and a negative transistor current source *72, each of which is controlled in complementary phase from the multivibrator switching waveforms.

The regeneration inverters *74, *75, configured as a standard C-MOS inverter-based multivibrator, form the regeneration feedback pair.

The buffer inverter *76 buffers internal timing signals from external load impedances. It toggles between zero and Vdd volts, with sharp rise and fall times, and is used as a drive signal for the negative voltage inverter *24 and as the control signal for the series isolation switch *78.

The positive current source *70 provides positive charging current to the timing capacitor *80. It provides fixed positive charging current during the time interval when the output of the regeneration inverter *74 is in its low voltage state. This current causes the input voltage to the regeneration inverter *75 to rise from its initial low voltage of approximately −Vdd/2, to +Vdd/2 at which time its output starts to change its voltage state from high to low. As this voltage drops, it causes the regeneration inverter *74 to change its output state also, to the high state. In this transition to the high state, the voltage on the timing capacitor *80, and thus on the drains of both the positive current source *70 and the negative current source *72, achieves its maximum value of approximately +3Vdd/2. In order to avoid conduction through the body diode of the positive current source *70, the cathode of which is tied to Vdd while its anode is tied to the drain of the device, the series isolation switch *78 is inserted.

The series isolation switch *78 is comprised of an n-type C-MOS transistor having its substrate tied to the internally generated negative voltage supply. It isolates the aforementioned positive signal, as it rises from +Vdd/2, from the positive current source *70. Both the positive current source *70 and the series isolation switch *78 are turned off during this interval, and in this case the series isolation switch presents a very high resistance to isolate the positive current source *70 and its associated body diode from the rising voltage.

The negative current source *72 provides negative charging current to timing capacitor *80. As the input to the regeneration inverter *75 declines to +Vdd/2, the two regeneration inverters *74,*75 regeneratively change state such that the output of the regeneration inverter *74 switches to low output state and the output of the regeneration inverter *75 switches to high output state. During this transition, the timing capacitor *80 output voltage is switched to approximately −Vdd/2 volts and the controlled currents are reversed to charge the timing capacitor *80 positive again. In accordance with the present invention the addition of switched current sources, protected against overvoltage with the series isolation switch *78, improves the operation of the astable multivibrator, compared to other embodiments.

In one common alternative, known to the prior art, poorly controlled semiconductor resistors offer low values of resistance and are non-linear over the range of voltage operation. The low values of resistance then demand, for a given frequency of operation, a larger timing capacitor which is incompatible with onboard integration. The resistive non-linearity causes non-uniformity and variation in the timing cycles. The latter effect is particularly dramatic when, as is the case for such multivibrators, voltage waveforms rise above the positive voltage for the circuit and dip below the negative voltage, for in this range the resistors have parasitic diode conduction which significantly distorts the desired timing waveform. To overcome this, timing resistors are often placed off-chip, as discrete external parts. This adds to package pin counts and package costs, as well as to circuit assembly costs. The alternative integrated resistor technology, thin film resistors, adds significantly to semiconductor processing cost. Thus, the employment of switched current sources in accordance with the present invention provides a substantial improvement in the cost\performance equation.

On/Off Comparator

The On/Off comparator *32 compares an external On/Off control signal *82 with the On/Off internal reference voltage *84, which is derived within the internal bias network *31. If the On/Off control signal *82 is higher than the On/Off internal reference voltage *84, it causes one set of bias amplifier *18 stages to be biased into inactive states with zero D-C bias current, accomplished by forcing the input voltage of the respective differential amplifiers *36 to ground with their respective On/Off switches *85. If the On/Off control signal *82 is lower than the On/Off internal reference voltage *84, it causes a different set of bias amplifier *18 stages to be biased into inactive states with zero D-C bias current. The complementary sets of bias control amplifiers are controlled from complementary signals, as applied to their respective On/Off switches *85. One signal is taken directly from the output of the On/Off Comparator *32, and its complement is taken from the output of the comparator inverter *33 which is itself driven from the output of the On/Off comparator *32.

The integration of the control function into the biasing system is an important contribution of the invention, particularly as the number of independent bias stages is increased. This is because all of the bias stages can be controlled with a single logic input, which causes independent controls to address each stage without any further external connection. This affords a significant reduction in package pin count and parts count compared to any other alternative.

While the description of the preferred embodiment is based on primary input of a positive supply voltage from an external source leading to the additional generation of negative voltage within the circuit, it is fully recognized that the invention could as well begin with primary input from a negative supply voltage for systems of which that is the source of supply, then generating a positive supply voltage internally.

System interfaces

The drain bias current of an external GaAs FET *16 amplifier stage is controlled by measurement of the voltage drop across the GaAs FET drain resistor *35, which is a specified resistor in series with the drain. The voltage drop, measured from a fixed reference voltage which is normally the positive supply voltage, provides a variable input voltage as an input, at the bias feedback terminal *28, to a bias control differential amplifier *36, and thus compares said variable voltage to an internal bias error reference voltage *20 which, as measured from the same supply voltage, sets the desired voltage drop to be established across the GaAs FET drain resistor *35. The bias control amplifier *18 then amplifies the difference between the actual voltage and the desired voltage, and also provides a level shift such that an error signal is produced, in proportion to the difference and reaching a potential which is suitable for biasing the GaAs FET control gate *17, through the bias output terminal *30. This error signal is of a sense such that the input voltage error, itself a measure of error in the GaAs FET *16 drain bias current, is corrected toward its desired value by negative feedback. Equilibrium is established when the input voltage becomes arbitrarily close to the internal bias error reference voltage *20, to a degree determined by the closed-loop gain and the internal offsets of the negative feedback system that the GaAs FET *16 and the bias control amplifier *18 together represent. Residual errors are measured in millivolts.

In order for the bias control amplifier *18 to attain the negative voltage required to drive the GaAs FET control gate *17 to an appropriate bias level, a negative voltage supply must be available to the system. Part of the function of the Integrated Negative D-C Bias System is to provide this negative supply, which generally is otherwise not needed in the receiver system. The voltage inverter *24 is incorporated in the system for this purpose.

The voltage inverter *24 converts the positive supply voltage to a negative voltage of approximately equal magnitude. To do so, it uses the periodic wavetrain, typically a square wave alternating between zero volts and the positive supply voltage, to drive a pair of switches which alternatively store charge with positive polarity on a charge pump capacitor *50, and transfer this charge with reverse polarity to a storage capacitor *52. The maximum charge pump voltage, and ultimately the maximum output storage voltage, are equal in magnitude to the positive supply voltage. Both voltages are diminished by circuit losses in the voltage inverter *24, and the output voltage is further diminished by external load currents which directly remove charge from the output. It is this load current which permits the bias control amplifiers *18 to be pulled to negative voltage levels, as required for the GaAs control gates *17. Since only limited currents can flow from these gates, the current absorbing capability of the voltage inverter *24 need not be large, and is in fact limited by fixed transistor-controlled output sink current sources *40 which are associated with the bias control amplifiers *18.

The astable multivibrator's *34 function is to provide the square wave driving signal needed by the voltage inverter *24. It operates at a toggle rate of approximately 1 MHz, a frequency which is chosen to improve load regulation of the voltage inverter *24 (to reduce sensitivity of negative voltage to the load current requirement) while permitting a small charge pump capacitance *50, enabling thereby its integration into a small, cost effective bias chip.

System Alternatives

Figure 2:
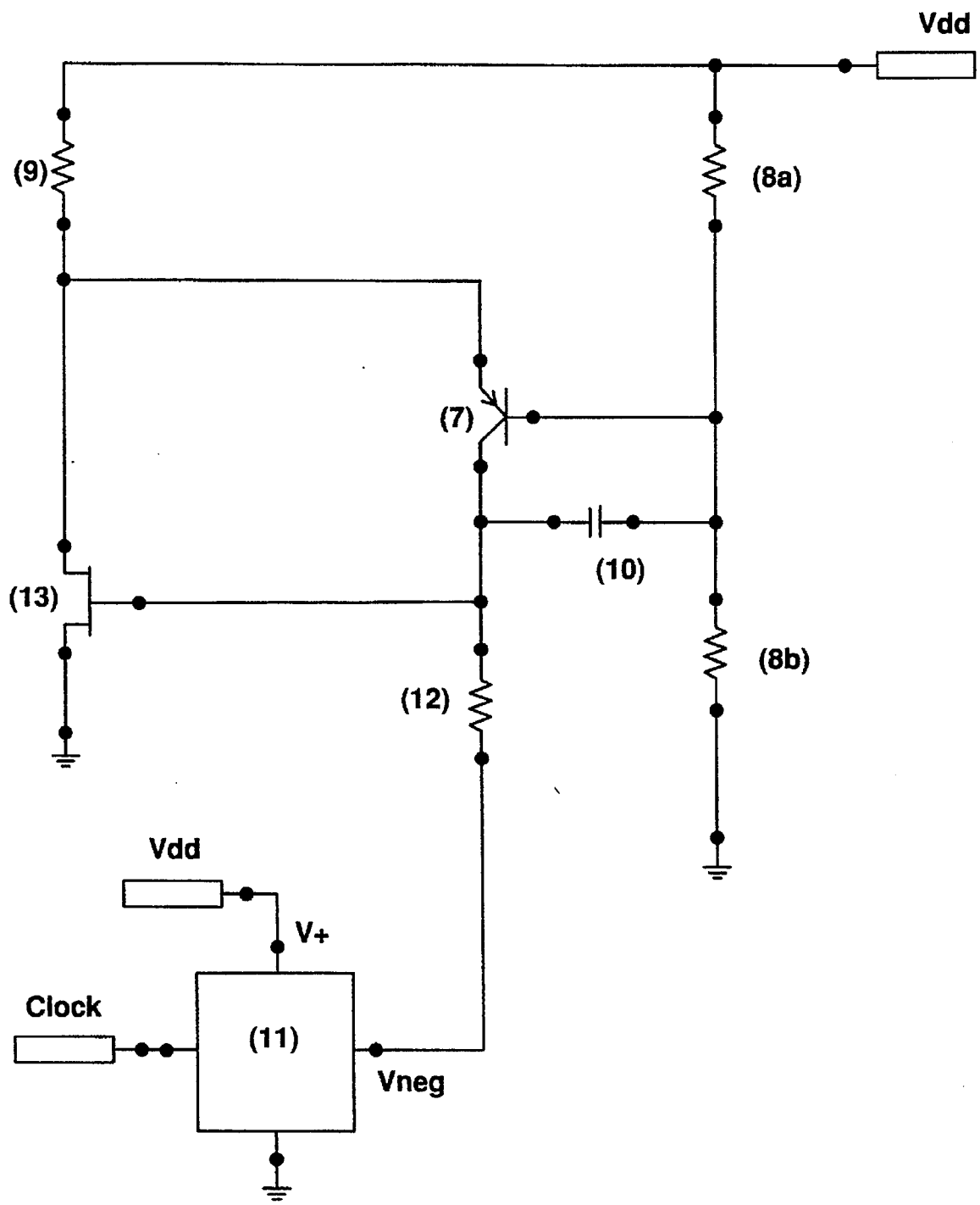
FIG. 2 is a schematic diagram of a prior art amplifier stage with active bias control.

Alternatives to the present invention include both examples of prior art given herein, namely the self-bias system *1 of FIG. 1 and the transistor active bias system *14 of FIG. 2. Neither alternative is shown as an integrated circuit, although consideration could be given to such a structure for its benefits of cost and parts count reduction. However, in the self-bias system *1, the requirement for the GaAs FET source bypass capacitors *6 makes monolithic integration difficult, and in any case bias control is not precise due to variation in transistor characteristics. In the transistor active bias system *14, the bipolar technology-based switching or rectification required for voltage inversion is not as efficient as C-MOS switching used in the present integrated circuit invention, and internal feedback compensation for the bias control amplifiers is not feasible due to the lower driving point impedance values of bipolar circuits.

A technologically more aggressive alternative would involve the integration of the bias functions directly into the GaAs materials used in the external amplifier cells. But since complementary devices are not readily available in GaAs, circuit solutions which are easy in Silicon C-MOS are not easy in GaAs, which is likely to include either depletion mode or enhancement mode n-channel devices, but not both. Moreover, GaAs is very expensive to process relative to Silicon, and the amplifiers require high-performance gate geometries which the bias circuits do not. Therefore, incorporation of the bias circuits directly in fully monolithically integrated GaAs is apt not to be cost-effective, and of little value except in military high-performance systems where the reduction in parts count and size could justify the increased cost.

I claim:

1. A monolithic integrated circuit of the C-MOS type for controlling a plurality of external devices each of which has a feedback terminal for generating a feedback voltage indicative of a circuit parameter, and a control terminal for controlling said parameter, said integrated circuit comprising:

(a) a plurality of differential amplifiers, one for controlling each of said external devices;

(b) means for feeding a positive supply voltage from an external source into said monolithic integrated circuit;

(c) means within said monolithic integrated circuit responsive to said positive supply voltage for generating an internal negative supply voltage;

(d) means for applying both said positive supply voltage and said internal negative supply voltage to each of said differential amplifiers, so that the output of each of said differential amplifiers may be either a positive or a negative voltage;

(e) means for deriving from said positive and negative supply voltages an internal error reference voltage, and applying it to each of said differential amplifiers;

(f) means for supplying a voltage feedback signal from the feedback terminal of each of said external devices to the corresponding one of said differential amplifiers;

(g) each of said differential amplifiers being operable for comparing the received voltage feedback signal and said internal error reference voltage to produce an error signal indicative of an error in said circuit parameter in the respective external device, and also for amplifying said error signal; and (h) means for supplying each said amplified error signal to the control terminal of the associated external device.

2. The integrated circuit of claim 1 which includes a voltage inverter for generating said internal negative supply voltage.

3. The integrated circuit of claim 2 which further includes a multivibrator circuit coupled to said voltage inverter to permit said voltage inverter to provide said negative voltage.

4. A low power amplifier system comprising an integrated circuit as in claim 1, wherein said plurality of external devices are amplifier stages, and wherein each said differential amplifier is adapted to control the bias current of a respectively associated amplifier stage.

5. The low power amplifier system of claim 4 wherein said integrated circuit includes a voltage inverter for generating said internal negative supply voltage, and a multivibrator circuit coupled to said voltage inverter to permit said voltage inverter to provide said negative voltage.

6. The low power amplifier system of claim 5 wherein said multivibrator circuit operates at a frequency in the order of at least about one Megahertz, said voltage inverter includes a small charge pump capacitor, and said amplifier system includes a storage capacitor located external to said integrated circuit, the capacitance value of said storage capacitor being of the order of at least one thousand times the capacitance value of said charge pump capacitor.

7. A monolithic integrated circuit for generating control signals for a plurality of external active electronic circuits each of which has a control terminal, and independently controlling for each respective one of said external active electronic circuits a circuit parameter that can be measured as a voltage, said integrated circuit comprising:

(a) a plurality of differential amplifiers, one for each of said external active circuits;

(b) means for feeding a positive supply voltage from an external source into said monolithic integrated circuit and applying it to each of said differential amplifiers;

(c) means within said monolithic integrated circuit for generating, in response to said positive supply voltage, a negative supply voltage that is approximately equivalent in magnitude to said positive supply voltage, and applying said negative supply voltage to each of said differential amplifiers;

(d) means for supplying from each of said external active electronic circuits to the corresponding one of said differential amplifiers a voltage feedback signal indicative of a measurement of said circuit parameter in the respective external circuit;

(e) an internal error reference voltage network responsive to said supply voltages for providing at least one internal error reference voltage;

(f) each of said differential amplifiers being operable to compare the received voltage feedback signal with an internal error reference voltage for producing an error signal indicative of an error in said circuit parameter in the respective external circuit, and also for amplifying said error signal; and (g) means for supplying each said amplified error signal to the control terminal of the associated external circuit.

8. The integrated circuit of claim 7 wherein said external active electronic circuits are amplifier stages, and wherein each said differential amplifier is adapted to control the bias current of a respectively associated amplifier stage.

9. A low power amplifier system comprising an integrated circuit as in claim 8, wherein said integrated circuit includes a voltage inverter for generating said internal negative supply voltage, and a multivibrator circuit coupled to said voltage inverter to permit said voltage inverter to provide said negative voltage.

10. The low power amplifier system of claim 9 wherein said multivibrator circuit operates at a frequency in the order of at least about one Megahertz, said voltage inverter includes a small charge pump capacitor, and said amplifier system includes a storage capacitor located external to said integrated circuit, the capacitance value of said storage capacitor being of the order of at least one thousand times the capacitance value of said charge pump capacitor.

11. A monolithic integrated circuit of the C-MOS type for controlling a plurality of external devices, comprising:

(a) a plurality of differential amplifiers, one for each of said external devices;

(b) means for feeding a positive supply voltage from an external source into said monolithic integrated circuit;

(c) means within said monolithic integrated circuit responsive to said positive supply voltage for generating an internal negative supply voltage;

(d) means for applying both of said supply voltages to each of said amplifiers;

(e) an internal error reference voltage network responsive to said supply voltages for providing at least one internal error reference voltage;

(f) means for supplying a separate voltage feedback signal from each of said external devices to a corresponding one of said amplifiers;

(g) each of said amplifiers being operable for comparing the received voltage feedback signal with a corresponding internal error reference voltage to produce an error signal indicative of an error in the respective external device, and also for amplifying said error signal; and (h) means for supplying each said amplified error signal to the associated external device.

12. The integrated circuit of claim 11 which includes a voltage inverter for generating said internal negative supply voltage, and a multivibrator circuit coupled to said voltage inverter to permit said voltage inverter to provide said negative voltage.

13. A low power amplifier system comprising an integrated circuit as in claim 11, wherein said plurality of external devices are amplifier stages, and wherein each said differential amplifier is adapted to control the bias current of a respectively associated amplifier stage.

14. The low power amplifier system of claim 13 wherein said integrated circuit includes a voltage inverter for generating said internal negative supply voltage, and a multivibrator circuit coupled to said voltage inverter to permit said voltage inverter to provide said negative voltage.

15. The low power amplifier system of claim 14 wherein said multivibrator circuit operates at a frequency in the order of one Megahertz, said voltage inverter includes a small charge pump capacitor, and said amplifier system includes a storage capacitor located external to said integrated circuit, the capacitance value of said storage capacitor being of the order of at least one thousand times the capacitance value of said charge pump capacitor.

\* \* \* \* \*